(12) United States Patent
Kikuyama

(10) Patent No.: US 8,390,848 B2
(45) Date of Patent: Mar. 5, 2013

(54) INFORMATION PROCESSING APPARATUS AND SECURED PRINTING SYSTEM FOR PREVENTING A DATA LEAKAGE

(75) Inventor: Tatsuya Kikuyama, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1058 days.

(21) Appl. No.: 12/370,388

(22) Filed: Feb. 12, 2009

(65) Prior Publication Data

US 2009/0201526 A1 Aug. 13, 2009

(30) Foreign Application Priority Data

Feb. 12, 2008 (JP) ................................ 2008-030322

(51) Int. Cl.
*G06K 15/00* (2006.01)
*G06F 3/12* (2006.01)
(52) U.S. Cl. ...................................... 358/1.15; 713/171
(58) Field of Classification Search .................. 358/1.15; 713/171

See application file for complete search history.

(56) References Cited

U.S. PATENT DOCUMENTS

| 7,450,260 | B2 | 11/2008 | Takeda | |
|---|---|---|---|---|
| 2005/0289346 | A1* | 12/2005 | Minagawa | 713/171 |
| 2006/0238805 | A1* | 10/2006 | Keeney et al. | 358/1.15 |

FOREIGN PATENT DOCUMENTS

| JP | 2002-342061 | 11/2002 |
|---|---|---|
| JP | 2004-287824 | 10/2004 |

* cited by examiner

*Primary Examiner* — Qian Yang
(74) *Attorney, Agent, or Firm* — Canon USA Inc. IP Division

(57) ABSTRACT

An information processing apparatus includes an application that encrypts document data using a public key of a spooler and stores the document data encrypted as a spool file. A printer driver decrypts the encrypted document data using a secret key of the spooler and performs rendering to generate print data. Subsequently, the application decrypts the print data using the public key of the printing apparatus. The printing apparatus decrypts the encrypted print data using the secret key of its own.

2 Claims, 7 Drawing Sheets

INFORMATION PROCESSING APPARATUS AND SECURED PRINTING SYSTEM FOR PREVENTING A DATA LEAKAGE

BACKGROUND OF THE INVENTION

1. Field of the Invention

The present invention relates to a printing system and an information processing apparatus capable of performing secured printing. More specifically, preventing document data encrypted by an application from leakage.

2. Description of the Related Art

When a user generates a document by an application and prints the document by a printing apparatus, it is essential to prevent the document from being browsed/printed illegally by a third person. Such a printing technology is referred to as secured printing.

For example, Adobe Acrobat that is an application for generating a Portable Document Format (PDF) file adopts a system in which document is encrypted and can be printed only when a password for permitting printing is presented. When such an application receives a printing instruction from a user, the application requests the password from the user. Upon obtaining the password, the application encrypts document by the application and passes the data to a spooler for printing.

Further, a unit method is used in which, when a printer driver in a printing system receives data via the application/spooler, the print driver encrypts and transmits the data provided with password information to a printer. Thus, secret information can be prevented from leakage that may occur between the printer driver and the printer (refer to Japanese Patent Application Laid-Open No. 2002-342061).

As another method, a printer driver receives certificate information and document encrypted by an application. Subsequently, the encrypted document provided with certificate information including a password is transmitted to a printer as print data, and the printer performs print processing on the decrypted data (refer to Japanese Patent Application Laid-Open No. 2004-287824).

However, in an environment where an application is connected with a printing system via a network, it is likely that secret information is leaked when the data is transmitted from the application to a spooler. In order to address this problem, for example, as described in Japanese Patent Application Laid-Open No. 2004-287824, a unit method is discussed where the data that is encrypted by the application and provided with the certificate information is transmitted to the printing apparatus.

However, this method cannot be employed in the printing performed by a host rendering printer that requires a host computer to perform rasterization processing. The host rendering printer requires decryption prior to rasterization so that the printer driver can perform rasterization. At this point, a spooler could decrypt document data. However, if the document data is decrypted before a spool file is generated, the document data can be browsed by extracting the spool file in the printing system.

Supposing that, in a printing system, the document data is encrypted immediately before being transmitted from the spooler to the printer driver, and a printer driver has a filter configuration. In this case, it is likely that the document data is leaked when the decrypted data is transmitted to the printer driver.

SUMMARY OF THE INVENTION

An object of the present invention is directed to secured printing in which document data encrypted by an application is prevented from leakage via at least a spooler or a printer driver during print processing.

Further, an object of the present invention is directed to secured printing in which the document data encrypted by the application is prevented from leakage via the processing by the spooler, the printer driver and overall printing apparatus.

According to an aspect of the present invention, a method for controlling an information processing apparatus that includes a storage unit configured to store a program that realizes a spooler for managing a print command based on a print instruction about document data via an application from a user, and a program that realizes a printer driver which transmits print data for printing the document data to a printing apparatus, the method includes, obtaining a public key of the spooler from the spooler and encrypting the document data using the obtained public key of the spooler by the application, upon receiving the print instruction about the document data from the user, obtaining the encrypted document data via the application and temporarily storing the encrypted document data that is obtained, by the printer driver, obtaining a secret key of the spooler from the spooler and decrypting the encrypted document data using the obtained secret key of the spooler, and generating print data based on the decrypted document data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 7:
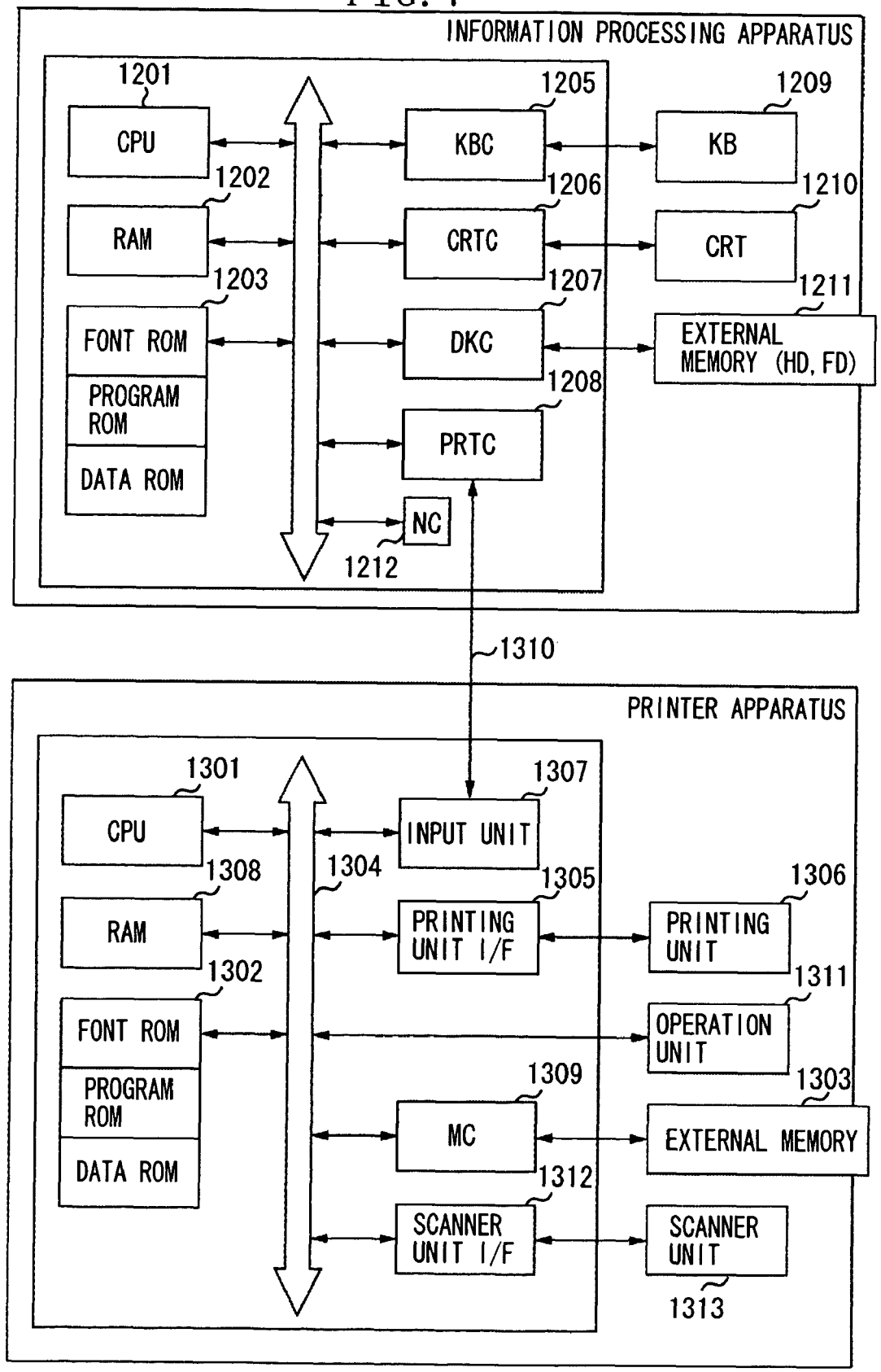
FIG. 7 is a diagram illustrating a configuration of hardware of the information processing apparatus and the printing apparatus that realize the system according to an exemplary embodiment of the present invention.

FIG. 7 illustrates a system in which an information processing apparatus and a printing apparatus according to an exemplary embodiment of the present invention are connected with each other via a network to enable communication.

First, a configuration of a hardware in the information processing apparatus will be described.

In FIG. 7, a central processing unit (CPU) 1201 performs programs such as an application and an operating system (OS) recorded in a read-only memory (ROM) for a program in a ROM 1203, or loaded from a hard disk (HD) 1211 to a random access memory (RAM) 1202. Processing illustrated by each flowchart can be realized by performing the program. The RAM 1202 functions as a primary memory and a working area of the CPU 1201. A key board controller (KBC) 1205 controls a key input from a key board 1209 or a pointing device (not illustrated).

A cathode ray tube (CRT) controller (CRTC) 1206 controls a display on a CRT display 1210. A disk controller (DKC) 1207 controls data access to the HD 1211 and a floppy disk (FD) that record various data. A printer controller (PRTC) 1208 controls communication of signals between the information processing apparatus and the printing apparatus connected with each other. Various connection types such as a local area network (LAN) and a universal serial bus (USB) can be applied to a connecting line 1310. A network controller (NC) 1212 is connected to the network to perform communication control for communicating with other devices connected to the network. The information processing apparatus may be configured to connect to other printing apparatuses and peripheral apparatuses via the network.

Next, a configuration of a hardware in the printing apparatus will be described.

In the printing apparatus, a CPU 1301 controls each block connected to a system bus 1304 according to a control program recorded in a ROM 1302 and an external memory 1303. An image signal generated by the CPU 1301 is output to a printing unit (printing engine) 1306 via a printing unit interface (I/F) 1305 as output information. Further, the CPU 1301 can perform communication with the information processing apparatus via an input unit 1307 to notify information about the printing apparatus to the information processing apparatus.

A program ROM in the ROM 1302 records a control program of the CPU 1301. A font ROM in the ROM 1302 records font data used to generate output information. A data ROM in the ROM 1302 records information used by the information processing apparatus when the printing apparatus does not include an external memory 1303 such as a hard disk.

A RAM 1308 functions as a main memory and a working area of the CPU 1301 and is configured so that a memory capacity can be expanded by an option RAM that can be connected to an expanded port (not illustrated). Further, the RAM 1308 is used as a region for expanding output information, a region for storing environment data, and a non-volatile RAM (NVRAM).

A memory controller (MC) 1309 controls the access of the external memory 1303 to the printing apparatus. The external memory 1303 is connected to the printing apparatus as an option and stores font data, emulation program, and form data. Further, an operation switch 1311 includes a switch and a light-emitting diode (LED) display for performing an operation.

A scanner unit I/F 1312 performs compensation, processing, and edition on image data received from a scanner unit 1313. The scanner unit 1313 inputs reflection light generated by exposing and scanning an image of a document to a charge-coupled device (CCD) sensor to convert image information into electric signals.

Further, the scanner unit 1313 converts the electric signals into brightness signals formed of each color of RGB and reads the brightness signals as image data. When a user issues an instruction to start reading via the operation unit 1311, the scanner unit 1313 is instructed via the scanner unit I/F 1312 to read a document. Upon receiving the instruction, the scanner unit 1313 operates to read the document.

Reading of the document may be performed by an automatically feeding method in which the document is set on a document feeder (not illustrated), or by a method in which the document is placed on a glass surface (not illustrated) and an exposure unit is moved for scanning the document.

In FIG. 7, the printing apparatus including the scanner unit is described. However, if the printing apparatus includes at least the printing unit, the present invention can be applied.

Figure 1:
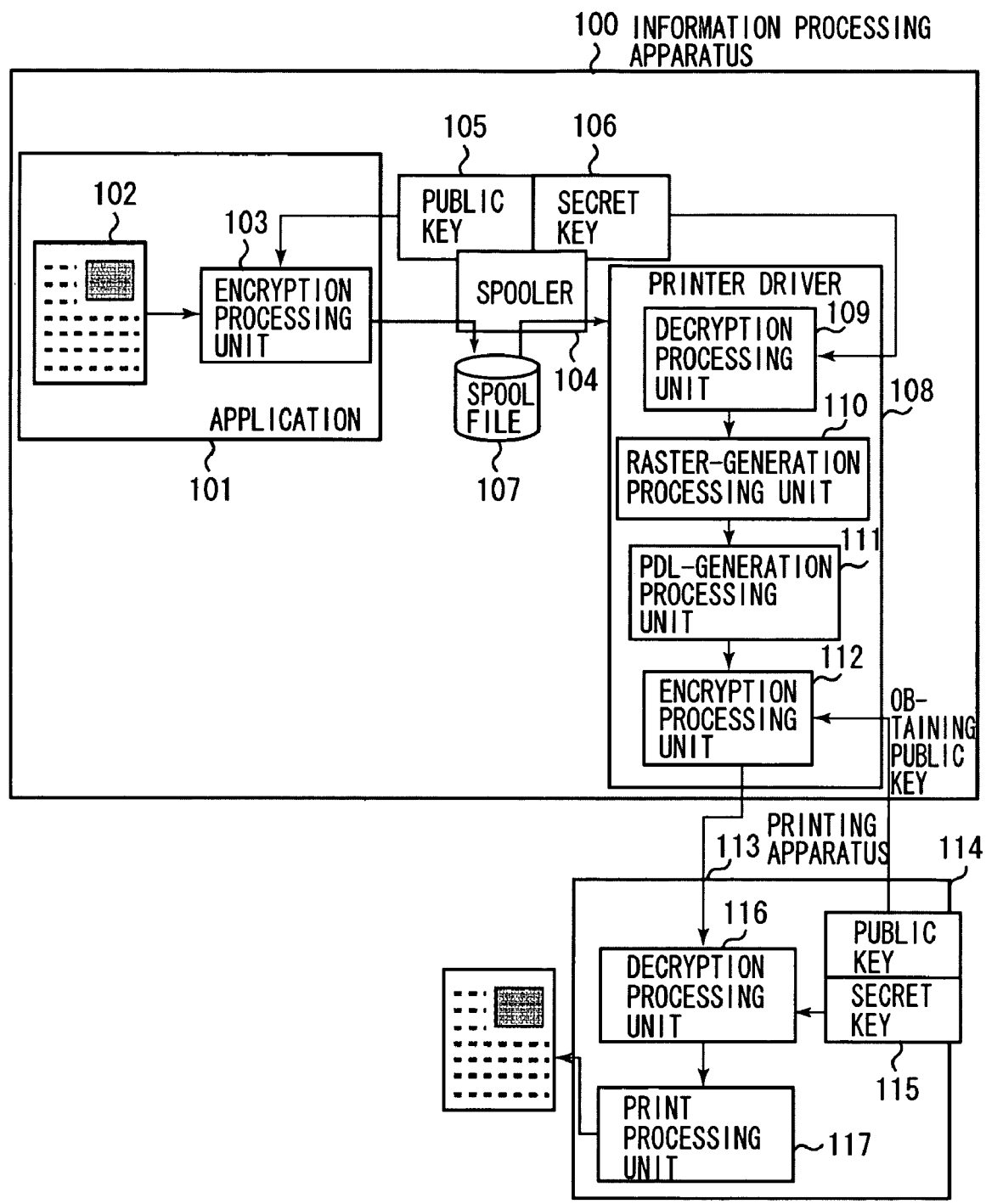
FIG. 1 is a diagram illustrating overall configuration of a system according to an exemplary embodiment of the present invention.

FIG. 1 is a diagram illustrating overall configuration of a printing system according to an exemplary embodiment of the present invention. In FIG. 1, an application 101 is a program that operates in an information processing apparatus 100 and is used for displaying and editing document data 102 including document and image. An encryption processing unit 103 included in the application 101 encrypts the document data 102.

A spooler 104 controls a print instruction generated in the information processing apparatus 100. Even when a plurality of print instructions is simultaneously issued, the document data is temporarily stored as a spool file 107 and the print instructions can be sequentially performed. The spooler 104 obtains a public key 105 that is an encryption key used for encrypting data and a secret key 106 used for decrypting the data encrypted by the public key 105.

A printer driver 108 is a printer driver set provided by a printer vendor and is stored in a recording apparatus in the information processing apparatus 100. The printer driver 108 generates print data to be transmitted to a printing apparatus 113 and performs processing for transmitting the data to the printing apparatus 113.

A decryption processing unit 109 is a module that performs decryption processing on the spool file 107 received from the spooler 104. A raster generation processing unit 110 is a module that generates an image from information in a vector form or outline font form to generate page description language (PDL) data. A PDL generation processing unit 111 is a module that converts the image into a data form that the printing apparatus can interpret and includes a printer control command such as a finisher added to a compressed image data. An encryption processing unit 112 is a module that again encrypts the PDL data and transmits the encrypted data.

The printing apparatus 113 receives the print data and performs print output. A decryption processing unit 116 is a module that decrypts the encrypted data received from the printer driver 108. A public key 114 and a secret key 115 are used respectively for encryption processing by the printer driver 108 and decryption processing by the printing apparatus 113 and are held in the printing apparatus 113.

Figure 2:
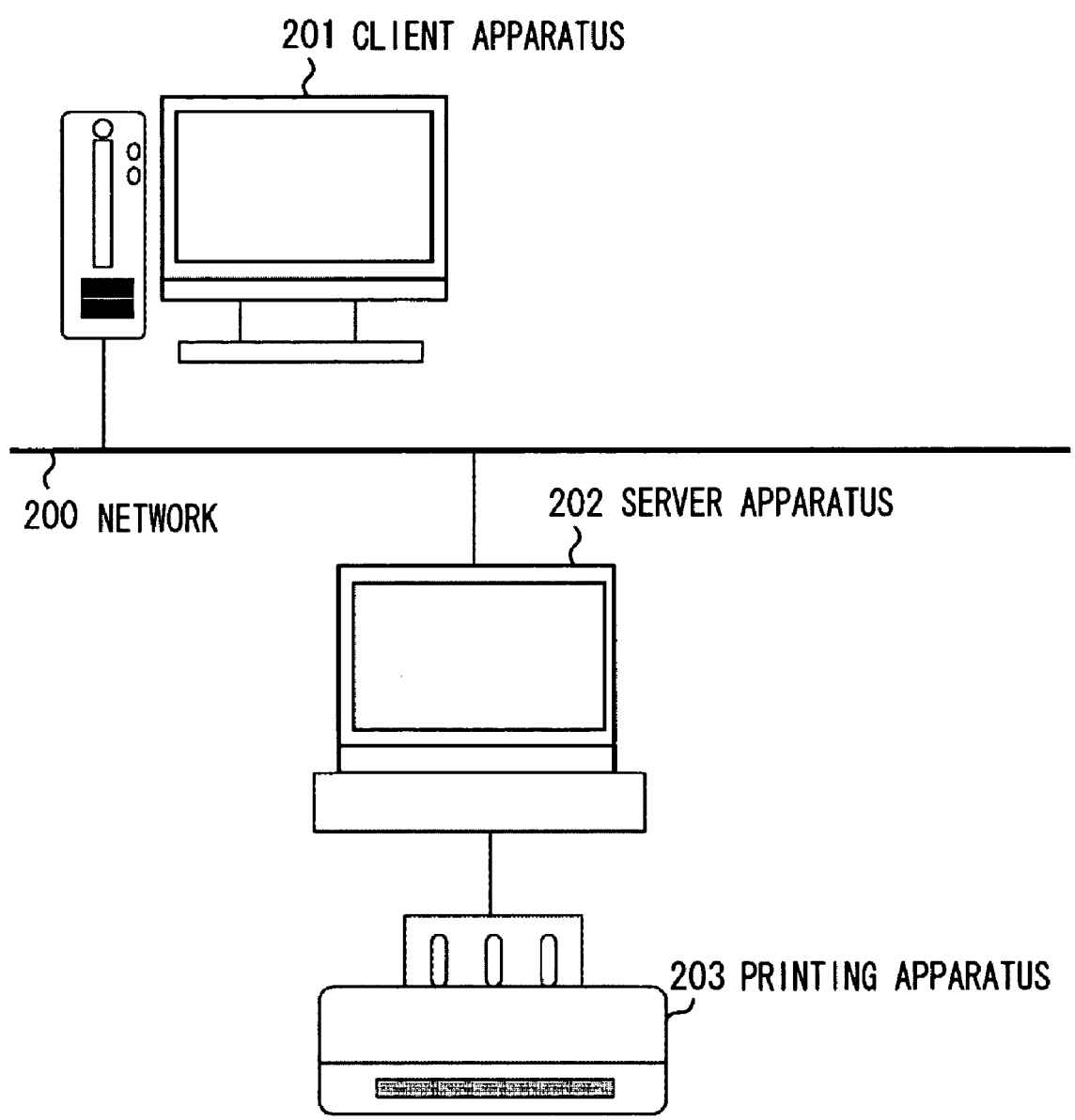
FIG. 2 is a block diagram illustrating a configuration of the system according to an exemplary embodiment of the present invention.

FIG. 2 is a block diagram illustrating a specific example of a configuration of the system illustrated in FIG. 1.

A network 200 is used for a local area network (LAN) inside an office, and a plurality of apparatuses such as a client apparatus 201 and a server apparatus 202 are connected to each other via the network 200.

The application 101 may be included in either of the client apparatus 201 and the server apparatus 202.

According to the present exemplary embodiment, the server apparatus 202 includes the spooler 104 and the printer driver 108. Both of the applications 101 and 101 included respectively in the client apparatus 201 and the server apparatus 202 that are connected to each other via the network 200 are a subject of the present exemplary embodiment.

A printing apparatus 203 corresponds to the printing apparatus 113. A printing apparatus 203 may be connected to the server apparatus 202 via an interface such as the network and the USB, or may be directly connected to the network 200.

Figure 3:
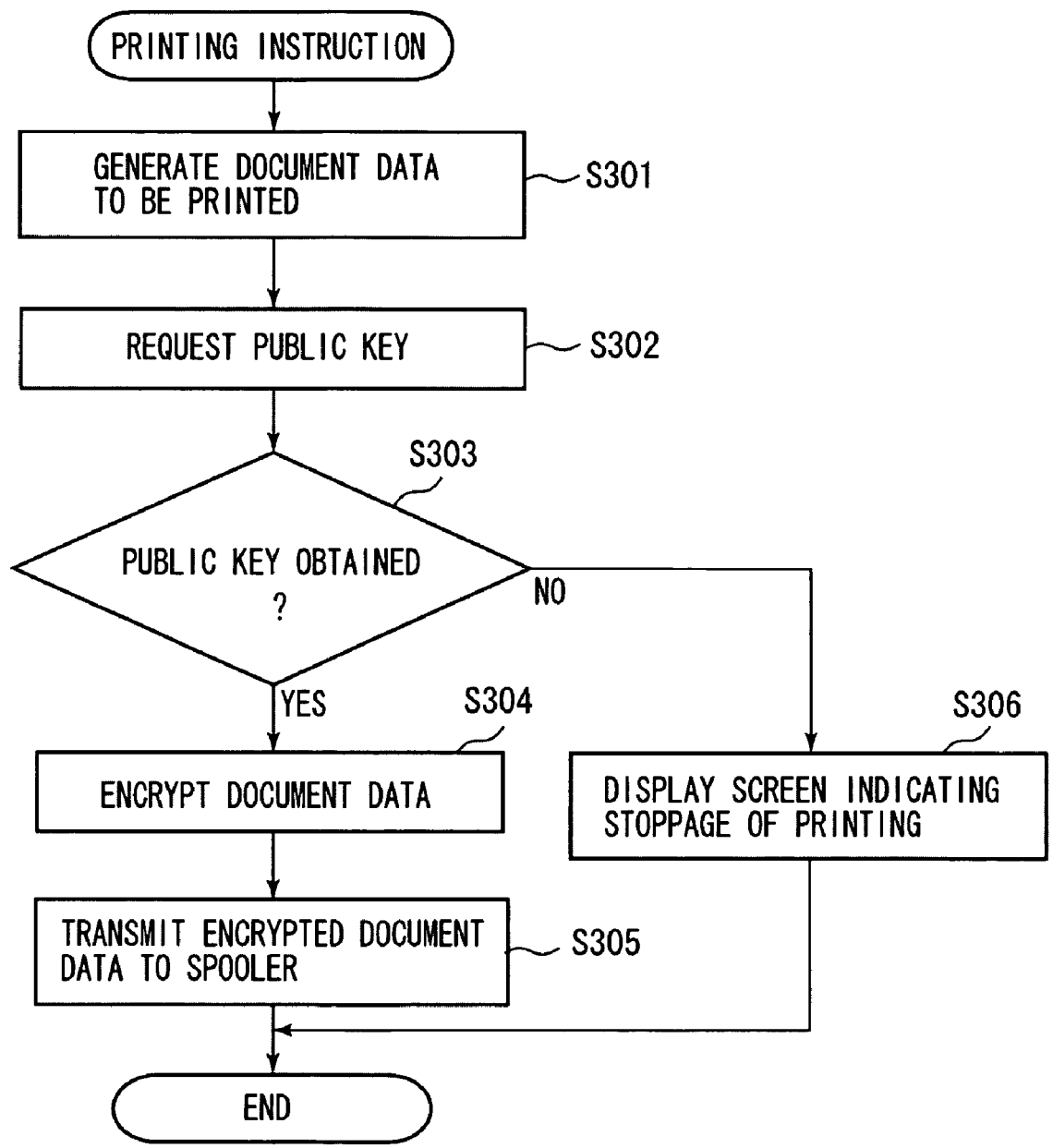
FIG. 3 is a flowchart illustrating processing by an application according to an exemplary embodiment of the present invention.

Referring to a flowchart of FIG. 3, a flow of processing in the application 101 will be described.

In step S301, upon receiving a print instruction from the user, the application 101 generates the document data 102 to be printed, using a graphic function, for example. Detailed generation processing of the document data 102 depends on the application 101 and the OS. For example, PDF is generated as a document for Mac OS, and PostScript is generated for Linux.

In step S302, the application 101 requests the public key 105 from the spooler 104 in the information processing apparatus 100.

In step S303, it is determined whether the public key 105 requested in step S302 is obtained. When the public key 105 described in step S302 can be obtained in step S303 (YES in step S303), the encryption processing unit 103 encrypts the document data 102 using the public key 105 in step S304. Since the encryption is performed according to a known method using a public key, details of encryption processing are not described here. In step S305, the application 101 transmits the document data encrypted in step S304 to the spooler 104.

When the public key 105 cannot be obtained due to an occurrence of an error or the like in step S303 (NO in step S303), the application 101 displays a screen to notify the user that printing is stopped and ends the printing processing in step S306. The display processing in step S306 is displayed in a message dialog by the application 101.

Figure 4:
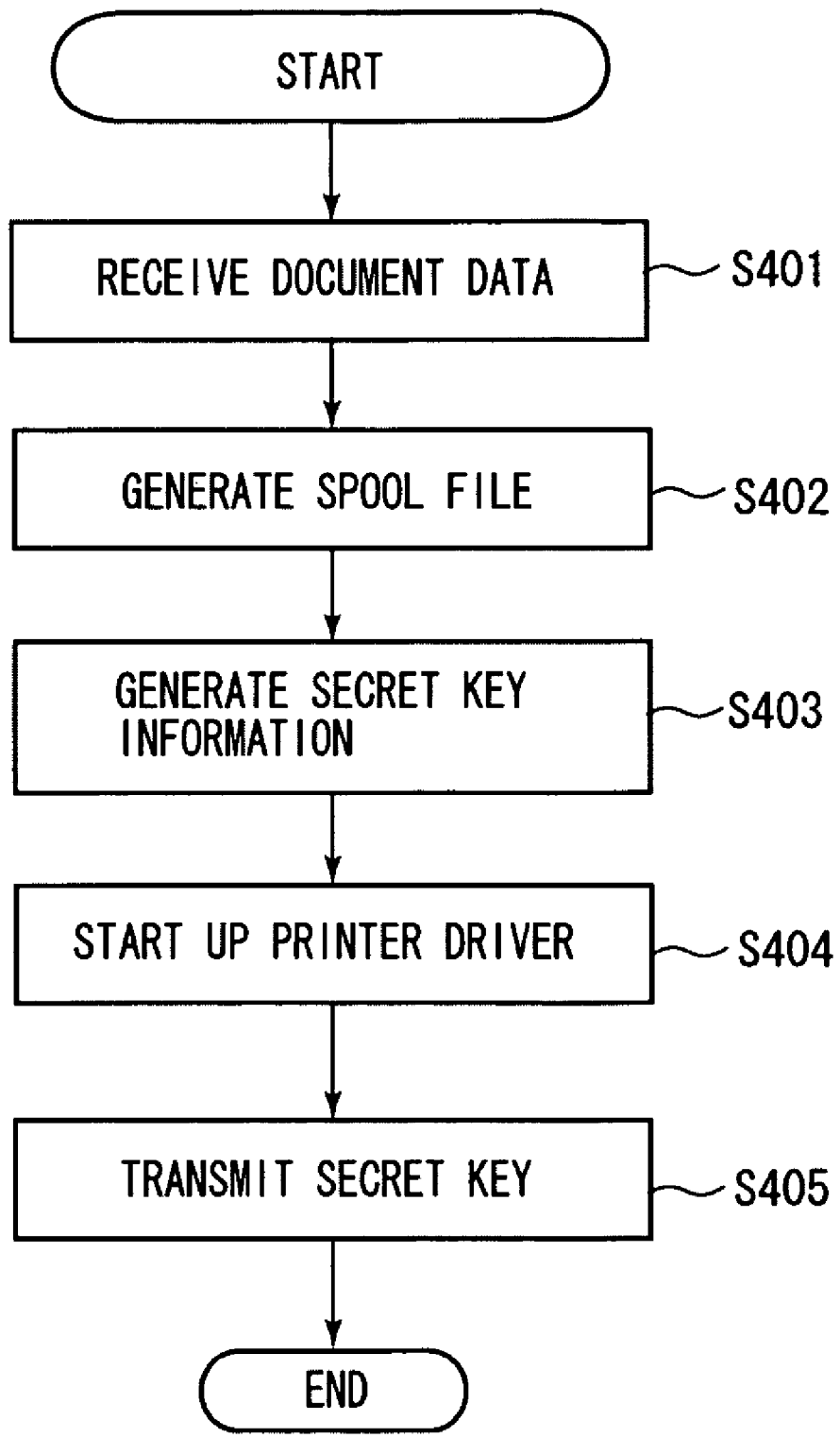
FIG. 4 is a flowchart illustrating processing by a spooler according to an exemplary embodiment of the present invention.

Referring to a flowchart of FIG. 4, processing by the spooler 104 will be sequentially described. The spooler 104 holds the public key 105 for encryption performed by the application 101 and the secret key 106 for decryption performed by the printer driver 108.

In step S401, the spooler 104 receives the document data to be printed from the application 101. The reception processing varies depending on the spooler 104. For example, the spooler 104 may receive the document data simply via a local path, or via the network according to Internet Printing Protocol (IPP).

In step S402, the spooler 104 generates the spool file 107 and temporarily stores the document data in the recording apparatus in the information processing apparatus 100.

In step S403, the spooler 104 obtains information about the secret key 106 to be held and records the information about the secret key 106 in a memory accessible only by the spooler 104.

In step S404, the spooler 104 activates the printer driver 108 that generates the print data which is an object to be printed by the printing apparatus 113. Regarding activating of the printer driver in step S404, the spooler 104 activates the printer driver 108 as one of the processes and further as a child process of the spooler 104. At this point, the spooler 104 provides a path of the spool file 107 as an argument for activating.

If the spooler 104 provides the path of the spool file 107 as an argument for activating, other users can easily confirm a status of a process in the information processing apparatus 100 using a system command. Therefore, it is possible to refer to the spool file 107. However, since the spool file 107 is encrypted, the spool file 107 cannot be decrypted without the information about the secret key 106. Thus, other users cannot browse the document.

The spooler 104 transmits the secret key 106 to the printer driver 108 when activating the printer driver 108 in step S404. Accordingly, a pipe is generated to connect a process of the spooler 104 to that of the printer driver 108.

In step S405, the spooler 104 provides information about the secret key 106 developed in a memory space which is accessible only by the spooler 104, to the printer driver 108 which is instructed by the spooler 104 to activate. The spooler 104 writes the information into the pipe connected to the printer driver 108. Since only the spooler 104 delivers and the printer driver 108 receives the secret key 106 via the pipe, other users or other processes cannot obtain the information about the secret key 106. Accordingly, even if the encrypted data should be leaked, the data cannot be decrypted by anything but the printer driver 108, resulting in preventing the secret information from leakage.

Figure 5:
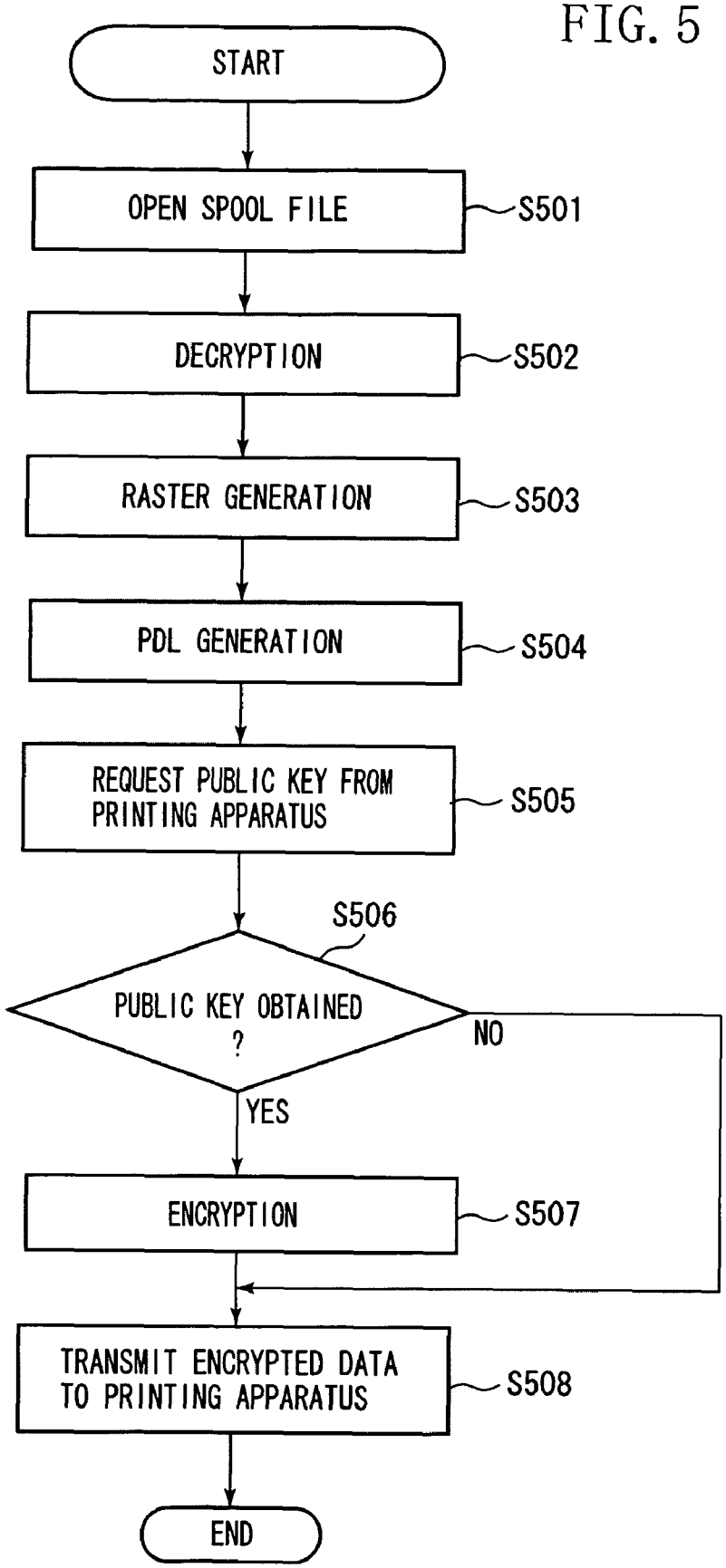
FIG. 5 is a flowchart illustrating processing by a printer driver according to an exemplary embodiment of the present invention.

Referring to a flowchart of FIG. 5, processing for generating print data by the printer driver 108 will be described in detail.

In step S501, the printer driver 108 activated by the spooler 104 as the child process of the spooler 104 opens the spool file 107 using the information about the path of the spool file 107 provided as an activating argument by the spooler 104.

In step S502, a decryption processing unit 109 of the printer driver 108 performs decryption processing. In the decryption processing performed in step S502, the secret key 106 is read from the pipe connecting the spooler 104 to the printer driver 108 and developed in the memory space accessible only by the printer driver 108. Further, the spool file 107 opened in step S501 is read into the same memory space accessible only by the printer driver 108.

The decryption processing by the decryption processing unit 109 is performed according to a known decryption method using secret key information. The decryption processing unit 109 stores the data decrypted in step S502 in a memory space accessible only by the printer driver 108. In step S503, the raster generation processing unit 110 in the printer driver 108 refers to the document data that is decrypted in step S502 and stored in the memory space and performs raster generation processing for converting the data into bitmap data.

The raster generation processing is generally referred to as rendering and a module that performs the raster generation processing is referred to as a renderer. The raster generation processing performed in step S503 may use a unique renderer provided by a printer vender as well as a renderer called out from the system.

However, when the system renderer is used, for example, the raster generation processing unit 110 directly calls out the system renderer via an application programming interface (API) of the system renderer so that the document data cannot be referred from an outside. The raster generation processing unit 110 stores the raster data in the memory space accessible only by the printer driver 108.

In step S504, the PDL generation processing unit 111 in the printer driver 108 refers to the data that is converted into the raster data in step S503 and stored in the memory space and performs PDL generation processing for converting the data into PDL data appropriate for the printing apparatus 113. The PDL generation processing unit 111 stores the PDL data in the memory space accessible only by the printer driver 108.

In step S505, the encryption processing unit 112 in the printer driver 108 requests the public key 114 in order to again encrypt the data converted into the PDL data in step S504.

In step S506, if the public key 114 can be obtained by the processing in step S505 (YES in step S506), the process proceeds to step S507, and the encryption processing unit 112 refers to the data that is converted into the PDL data in step S504 and stored in the memory space and performs decryption processing using the public key 114.

Decryption in step S507 may be performed according to a known method of decryption using a public key as well. In step S508, the encryption processing unit 112 transmits the data encrypted in step S507 to the printing apparatus 113. When the data is transmitted in step S508, for example, the encryption processing unit 112 sets a flag indicating the encrypted data at a head portion of the data to be transmitted, so that encrypted data can be discriminated.

A transmission method varies depending on a form of connection between the information processing apparatus 100 and the printing apparatus 113. For example, when the network is used for the connection, a protocol such as line printer daemon (LPD) is used for transmission. On the other hand, when the USB is used, a method is determined based on a specification of the interface.

In step S506, when the public key 114 cannot be obtained for some reason, for example, when the printing apparatus 113 is not adapted to receive the encrypted data, the encryption processing unit 112 proceeds to step S508 without performing the encryption processing in step S507.

In step S508, the encryption processing unit 112 transmits the unencrypted data as it is to the printing apparatus 113 and the printer driver 108 ends the processing. At this point, the flag indicating the decrypted data is not set at the head of the data to be transmitted.

When the public key 114 is not obtained in step S506, a screen indicating that printing is stopped, may be displayed for the user, and the print processing is ended. In display processing, a message dialog is displayed on the information processing apparatus that includes the application.

Figure 6:
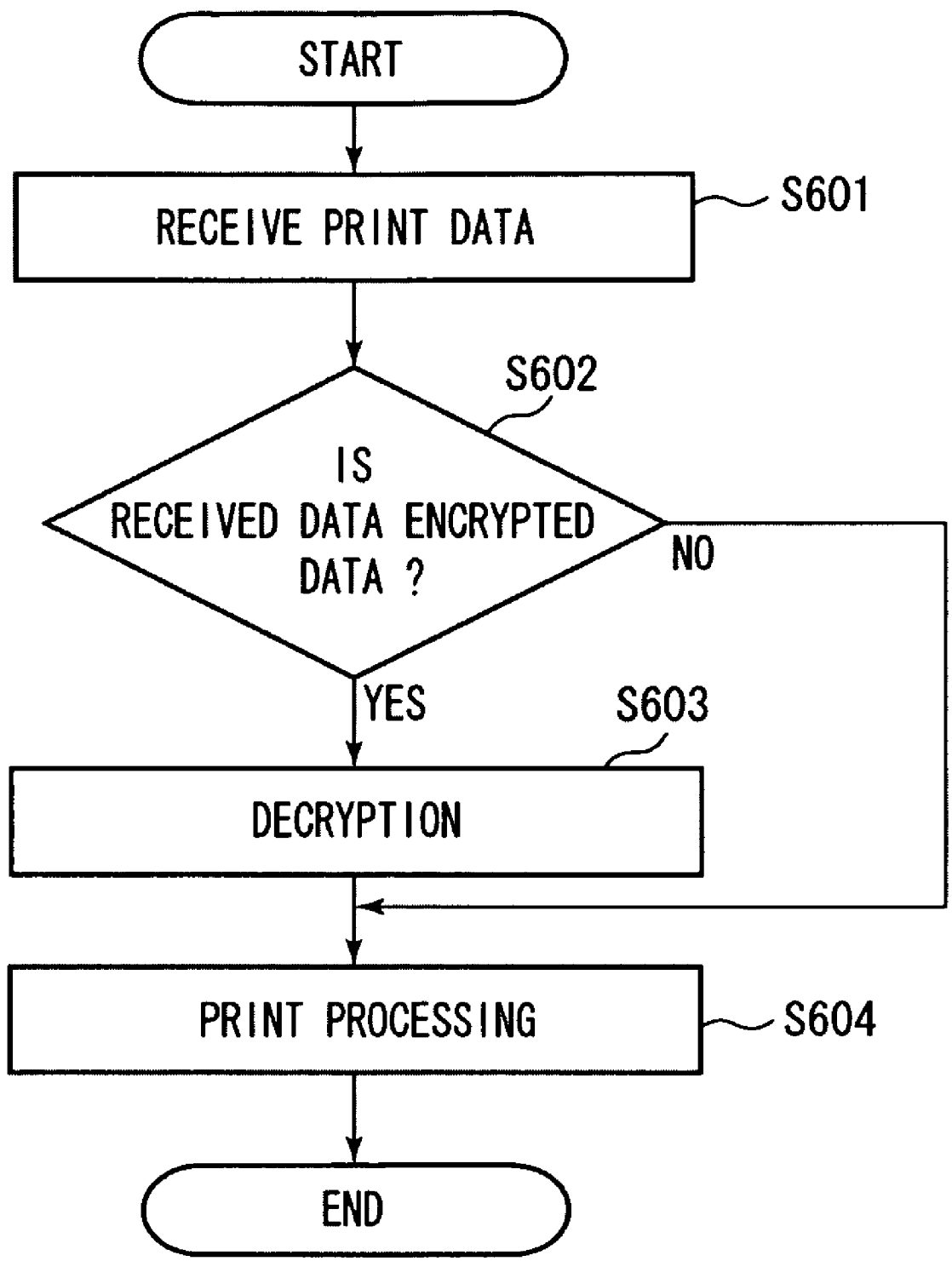
FIG. 6 is a flowchart illustrating processing by a printing apparatus according to an exemplary embodiment of the present invention.

The printing apparatus 113 holds the public key 114 for encryption by the printer driver 108 and the secret key 115 for decryption by the printing apparatus 113. Referring to a flowchart of FIG. 6, a flow of processing performed by the printing apparatus 113 will be specifically described.

In step S601, the printing apparatus 113 receives the print data transmitted from the printer driver 108.

In step S602, the decryption processing unit 116 of the printing apparatus 113 determines whether the print data received in step S601 is the encrypted data. The encrypted print data can be determined in step S602 according to whether the flag indicating the encrypted data is set at the head portion of the received print data.

In step S602, if the flag indicating the encrypted data is set at the head of the received print data, the decryption processing unit 116 determines that the received print data is encrypted. In step S603, the decryption processing unit 116 performs the decryption processing using the secret key 115 held by the printing apparatus 113 itself. The decryption processing is performed in step S603 according to a known decryption processing using a secret key. In step S604, the print processing unit 117 of the printing apparatus 113 performs the print processing on the data decrypted by the decryption processing unit 116.

When the received print data is checked in step S602, if it is determined that the print data is not the encrypted data, the processing proceeds to step S604 without performing the decryption processing in step S603.

In step S604, the print processing unit 117 performs the print processing and ends the print processing in the printing apparatus 113.

According to the exemplary embodiment as above described, the application 101 encrypts the data using the public key 105 obtained from the spooler 104. The printer driver 108 activated by the spooler 104 decrypts the encrypted document data using the secret key 106 held by the spooler 104. Further, the printer driver 108 encrypts the PDL data using the public key 114 obtained from the printing apparatus 113. The printing apparatus 113 decrypts the data using the secret key 115 and prints out the decrypted data.

In the configuration as described above, the secured printing system can be established in which the document data is not illegally browsed during the printing process performed by the application in the printing apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-030322 filed Feb. 12, 2008, which is hereby incorporated by reference herein in its entirety.

What is claimed is:

1. An information processing apparatus comprising:
    a storage unit configured to store a program that realizes an application which enables a user to provide a print instruction about document data, a program that realizes a spooler for managing a print command based on the print instruction via the application, and a program that realizes a printer driver which transmits print data for printing the document data to a printing apparatus; and
    a control unit configured to execute the application, the spooler, and the printer driver based on the programs stored in the storage unit,
    wherein, upon receiving the print instruction about the document data from the user, the application obtains a public key of the spooler from the spooler and encrypts the document data using the obtained public key of the spooler,
    wherein the storage unit obtains the encrypted document data via the application and temporarily stores the encrypted document data that it obtains,
    wherein the printer driver obtains a secret key of the spooler from the spooler and decrypts the encrypted document data stored in the storage unit using the obtained secret key of the spooler, and generates print data based on the decrypted document data,
    wherein the spooler issues an instruction to activate the printer driver, and
    wherein the secret key of the spooler can be referred only from the printer driver.

2. A method for controlling an information processing apparatus including a storage unit configured to store a program that realizes a spooler for managing a print command based on a print instruction about document data via an application from a user, a program that realizes a printer driver which transmits to a printing apparatus print data for printing the document data, the method comprising:
    upon receiving the print instruction about the document data from the user, obtaining a public key of the spooler from the spooler and encrypting the document data using the obtained public key of the spooler, by the application;
    obtaining the encrypted document data via the application and temporarily storing the obtained encrypted document data;
    obtaining a secret key of the spooler from the spooler and decrypting the encrypted document data using the obtained secret key of the spooler, by the printer driver;

generating print data based on the decrypted document data by the printer driver, wherein the spooler issues an instruction to activate the printer driver, and wherein the secret key of the spooler can be referred only by the printer driver.

* * * * *